United States Patent
Oizumi et al.

(10) Patent No.: US 10,614,390 B2
(45) Date of Patent: Apr. 7, 2020

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventors: Masahiro Oizumi, Kanagawa (JP); Kazuo Shibuta, Kanagawa (JP); Norihito Mizobata, Kanagawa (JP); Kojiro Tsutsumi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 427 days.

(21) Appl. No.: 15/455,250

(22) Filed: Mar. 10, 2017

(65) Prior Publication Data
US 2018/0018604 A1    Jan. 18, 2018

(30) Foreign Application Priority Data
Jul. 15, 2016    (JP) .................................. 2016-140145

(51) Int. Cl.
*G06Q 10/06* (2012.01)

(52) U.S. Cl.
CPC . *G06Q 10/06311* (2013.01); *G06Q 10/06316* (2013.01)

(58) Field of Classification Search
CPC ......... G06Q 10/00; G06Q 40/06; G06Q 40/00
USPC ....................................................... 705/7.13
See application file for complete search history.

(56) References Cited

U.S. PATENT DOCUMENTS

| | | | |
|---|---|---|---|
| 2004/0236670 A1 | 11/2004 | Hara | |
| 2012/0131572 A1* | 5/2012 | Shae | G06F 9/45558 718/1 |
| 2013/0054485 A1* | 2/2013 | Allin | G06Q 10/06 705/342 |
| 2013/0073343 A1* | 3/2013 | Richardson | G06Q 30/02 705/7.38 |
| 2014/0067451 A1* | 3/2014 | Balamurugan | G06Q 10/06 705/7.14 |

FOREIGN PATENT DOCUMENTS

JP    2004-341985 A    12/2004

* cited by examiner

*Primary Examiner* — Romain Jeanty
(74) *Attorney, Agent, or Firm* — Sughrue Mion, PLLC

(57) ABSTRACT

Provided is an information processing apparatus, including a task request receiving unit that receives a request for a task of creating contents, a contract entry receiving unit that receives an entry of a contract of the task, a method selection receiving unit that receives a selection of any one of a designation method, and a competition method, and a task contract requesting unit that outputs information for requesting a contract of the task to the one or more applicants designated among the applicants whose entry is received by the contract entry receiving unit when the designation method is selected and outputs information for requesting a contract of all or a part of the task to the two or more applicants whose entry is received by the contract entry receiving unit when the competition method is selected.

11 Claims, 12 Drawing Sheets

| USER ID | REQUESTED TASK | CONTRACTED TASK |
|---|---|---|
| A | — | ZZ-007 |
| B | — | ZZ-007 |
| C | ZZ-008 | — |
| ⋮ | ⋮ | ⋮ |

| MANAGEMENT NUMBER | ORIGINAL DRAFT IMAGE | ORDERING METHOD | STATUS | DUE DATE |
|---|---|---|---|---|
| ZZ-007 | IMG-001 | COMPETITION METHOD | SUBMISSION COMPLETED | 2016/07/01 10:00 |
| ZZ-008 | IMG-002 | DESIGNATION METHOD | ORDER COMPLETED | 2016/07/05 12:00 |
| ZZ-009 | IMG-003 | — | NOW COLLECTING | — |
| ⋮ | ⋮ | ⋮ | ⋮ | ⋮ |

FIG.7

| MANAGEMENT NUMBER | APPLICANT | CONTENTS | ORDER FLAG |
|---|---|---|---|
| ZZ-007 | A | CNT-001 | ON |
|  | B | CNT-002 | ON |
| ZZ-008 | D | — | OFF |
|  | E | — | ON |
|  | F | — | OFF |
| ZZ-009 | G | — | OFF |
| ⋮ | ⋮ | ⋮ | ⋮ |

323

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-140145 filed Jul. 15, 2016.

BACKGROUND

The present invention relates to an information processing apparatus, an information processing method, and a non-transitory computer readable medium.

SUMMARY

According to an aspect of the invention, there is provided an information processing apparatus, including:
a task request receiving unit that receives a request for a task of creating contents;
a contract entry receiving unit that receives an entry of a contract of the task;
a method selection receiving unit that receives a selection of any one of a designation method that designates one or more applicants among applicants whose entry is received by the contract entry receiving unit and requests the task to the one or more designated applicants, and a competition method that requests all or a part of the task to two or more applicants whose entry is received by the contract entry receiving unit and competitively determines which content is better; and
a task contract requesting unit that outputs information for requesting a contract of the task to the one or more applicants designated among the applicants whose entry is received by the contract entry receiving unit when the designation method is selected and outputs information for requesting a contract of all or a part of the task to the two or more applicants whose entry is received by the contract entry receiving unit when the competition method is selected.

BRIEF DESCRIPTION OF THE DRAWINGS

Exemplary embodiments of the present invention will be described in detail based on the following figures, wherein:
FIG. 7 is a view illustrating an example of an applicant information database.

DETAILED DESCRIPTION

Hereinafter, an exemplary embodiment of the present invention will be described with reference to the drawings.

1. Exemplary Embodiment

1-1. Configuration

1-1-1. Task Outsourcing System 1

Figure 1:
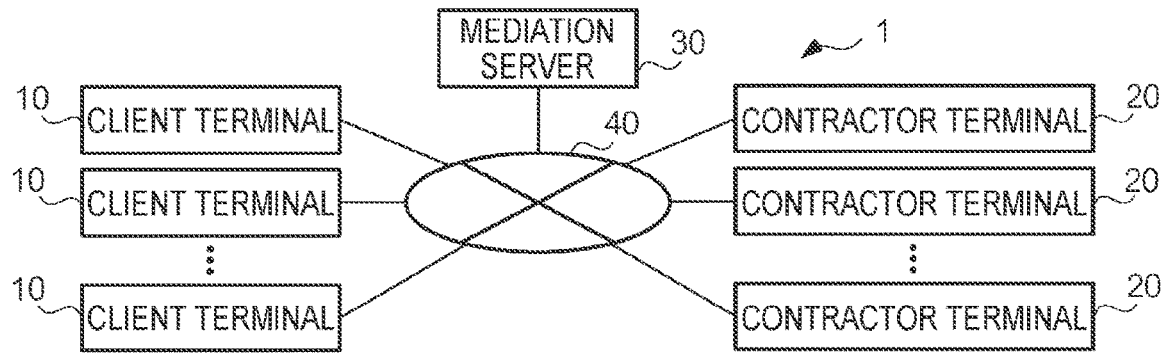
FIG. 1 is a block diagram illustrating an exemplary configuration of a task outsourcing system.

FIG. 1 is a block diagram illustrating an exemplary configuration of a task outsourcing system 1 according to an exemplary embodiment of the present invention. The task outsourcing system 1 includes one or more client terminals 10 that are used by a client of a task, one or more contractor terminals 20 that are used by a contractor of the task, and a mediation server 30 that mediates the task from the client to the contractor. The client terminal 10, the contractor terminal 20, and the mediation server 30 are connected to each other through a communication line 40 such as the Internet.

1-1-2. Client Terminal 10

Figure 2:
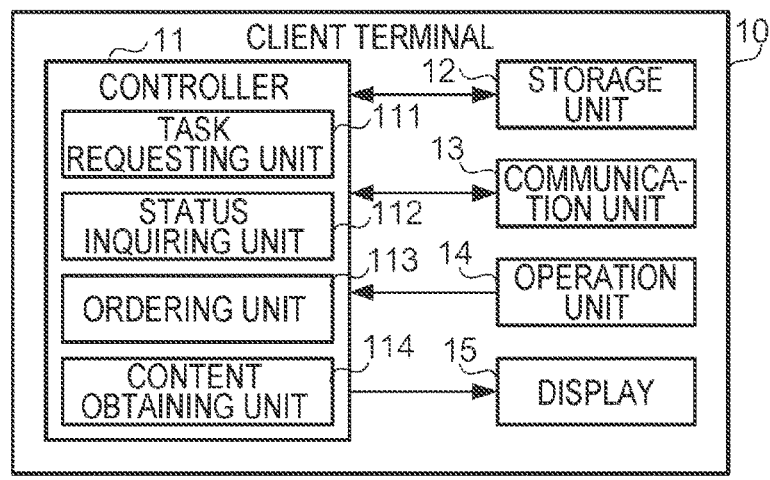
FIG. 2 is a block diagram illustrating an exemplary configuration of a client terminal.

FIG. 2 is a block diagram illustrating an exemplary configuration of the client terminal 10. The client terminal 10 is a computer. For example, the client terminal 10 is a portable computer such as a smartphone or a tablet terminal or a stationary computer. The client terminal 10 substantially includes a controller 11, a storage unit 12, a communication unit 13, an operation unit 14, and a display 15.

The controller 11 includes an arithmetic processing device such as a central processing unit (CPU) and a memory and executes a program stored in the memory or the storage unit 12. The storage unit 12 is a storage device such as a flash memory and stores a program executed by the controller 11. The communication unit 13 is a communication module such as a data communication card and communicates with the mediation server 30 through a communication line 40. The operation unit 14 is an operation receiving device such as a touch sensor or an operation key and outputs information of operation by an operator to the controller 11. The display 15 is a display device such as a liquid crystal display or an organic EL display and displays an image output from the controller 11.

The controller 11 executes a program stored in the storage unit 12 to implement functions as a task requesting unit 111, a status inquiring unit 112, an ordering unit 113, and a content obtaining unit 114.

The task requesting unit 111 requests a task of creating contents to the mediation server 30. Specifically, the task requesting unit 111 receives an instruction from a client who requests a task of creating contents and requests an upload screen for uploading an image representing an original draft of the contents to the mediation server 30. When the upload screen transmitted from the mediation server 30 is received, the upload screen is displayed on the display 15. After displaying the upload screen, when the client operates the operation unit 14 to select the image representing the original draft of the contents and issue an uploading instruction, the task requesting unit 111 transmits a task request including the selected image to the mediation server 30. After transmitting the task request, the task requesting unit 111 allows the display 15 to display a management number informed from the mediation server 30.

The status inquiring unit 112 inquires of the server about the status of the requested task to the mediation server 30. Specifically, the status inquiring unit 112 receives an instruction from the client who wants to check the status of the task and requests the mediation server 30 for the status screen. When the status screen transmitted from the mediation server 30 is received, the status screen is displayed on the display 15.

The ordering unit 113 designates an ordering method and orders the mediation server 30 to create contents. Specifically, the ordering unit 113 receives an instruction from the client who wants to display the order screen and requests the mediation server 30 for the order screen. Then, when the order screen transmitted from the mediation server 30 is received, the order screen is displayed on the display 15. A designation method and a competition method are presented on the displayed order screen as options of the ordering method. Further, information on an applicant for contracting the task is presented. After displaying the order screen, when the client operates the operation unit 14 to select any one ordering method, the ordering unit 113 transmits an ordering request that informs the selected ordering method to the mediation server 30.

The content obtaining unit 114 obtains the contents created by the contractor, from the mediation server 30. Specifically, when the client who selects the competition method as an ordering method instructs to display the list screen of contents created by each contractor, the content obtaining unit 114 requests the mediation server 30 for the content list screen. When the content list screen transmitted from the mediation server 30 is received, the content list screen is displayed on the display 15. After displaying the content list screen, when the client operates the operation unit 14 to select any content, the content obtaining unit 114 transmits a content request for designating the selected content to the mediation server 30. Further, the content obtaining unit 114 stores the content transmitted from the mediation server 30 in the storage unit 12.

When the client who selects the designation method as an ordering method instructs to download the contents created by the designated contractor, the content obtaining unit 114 transmits a content request for requesting the contents to the mediation server 30. Then, the content obtaining unit 114 stores the content transmitted from the mediation server 30 in the storage unit 12.

1-1-3. Contractor Terminal 20

Figure 3:
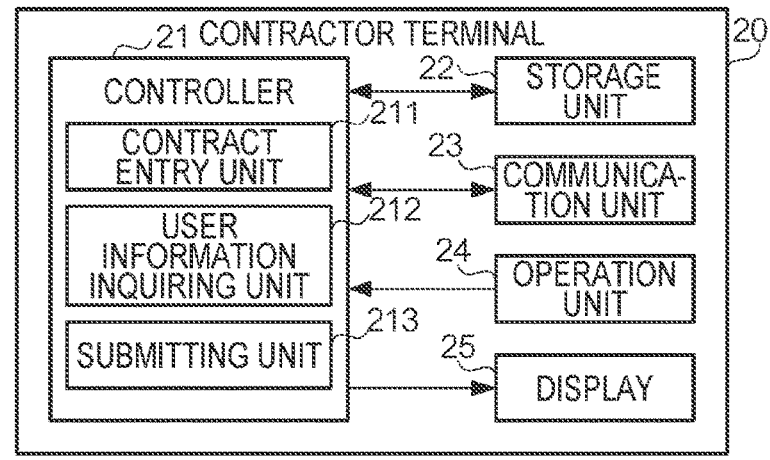
FIG. 3 is a block diagram illustrating an exemplary configuration of a contractor terminal.

FIG. 3 is a block diagram illustrating an exemplary configuration of the contractor terminal 20. The contractor terminal 20 is a computer. For example, the contractor terminal 20 is a portable computer such as a smartphone or a tablet terminal or a stationary computer. The contractor terminal 20 substantially includes a controller 21, a storage unit 22, a communication unit 23, an operation unit 24, and a display 25.

The controller 21 includes an arithmetic processing device such as a central processing unit (CPU) and a memory and executes a program stored in the memory or the storage unit 22. The storage unit 22 is a storage device such as a flash memory and stores a program executed by the controller 21. The communication unit 23 is a communication module such as a data communication card and communicates with the mediation server 30 through the communication line 40. The operation unit 24 is an operation receiving device such as a touch sensor or an operation key and outputs information of operation by an operator to the controller 21. The display 25 is a display device such as a liquid crystal display or an organic EL display and displays an image output from the controller 21.

The controller 21 executes the program stored in the storage unit 22 to implement functions as a contract entry unit 211, a user information inquiring unit 212, and a submitting unit 213.

The contract entry unit 211 applies for a contract for a task of creating contents to the mediation server 30. Specifically, the contract entry unit 211 receives an instruction from a contractor who wants to contract a task of creating contents and requests the mediation server 30 for a contract collecting screen. Then, when the contract collecting screen transmitted from the mediation server 30 is received, the contract entry unit 211 displays the contract collecting screen on the display 25. After displaying the contract collecting screen, when the contractor operates the operation unit 24 to instruct an entry of the contract for the task, the contract entry unit 211 transmits a contract application including a management number of the task to the mediation server 30.

The user information inquiring unit 212 inquires the mediation server 30 for information on an order to the contractor. Specifically, the user information inquiring unit 212 receives instruction from the contractor who wants to check the order to the contractor to request the mediation server 30 for a user information screen. Then, when the user information screen transmitted from the mediation server 30 is received, the user information inquiring unit 212 displays the user information screen on the display 25.

The submitting unit 213 submits the contents created by the contractor to the mediation server 30. Specifically, the submitting unit 213 receives the instruction from the contractor who creates the contents and requests the mediation server 30 for an upload screen to upload the contents. When the upload screen transmitted from the mediation server 30 is received, the submitting unit 213 displays the upload screen on the display 25. After displaying the upload screen, when the contractor operates the operation unit 24 to select the created content and instruct to upload the selected content, the submitting unit 213 transmits the selected content to the mediation server 30.

1-1-4. Mediation Server 30

Figures 4, 5, 6:
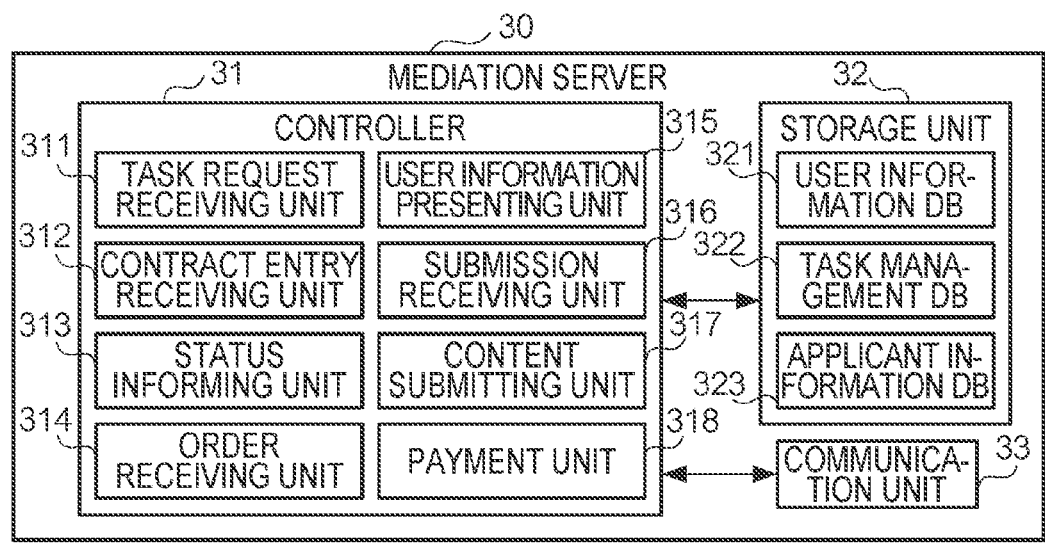
FIG. 4 is a block diagram illustrating an exemplary configuration of a mediation server.
FIG. 5 is a view illustrating an example of a user information database.
FIG. 6 is a view illustrating an example of a task management database.

FIG. 4 is a block diagram illustrating an exemplary configuration of a mediation server 30. The mediation server 30 is a web server and an example of an information processing apparatus according to the present invention. The mediation server 30 substantially includes a controller 31, a storage unit 32, and a communication unit 33.

The controller 31 includes an arithmetic processing device such as a central processing unit (CPU) and a memory and executes a program stored in the memory or the storage unit 32. The storage unit 32 is a storage device such as a hard disk drive (HDD) and stores a program to be executed by the controller 31. The storage unit 32 may be installed in an external server that is connected through the communication line 40. The communication unit 33 is a communication module such as a data communication card and communicates with the client terminal 10 and the contractor terminal 20 through the communication line 40.

The storage unit 32 stores a user information database 321 that manages information of a user who uses a mediation service of the task, a task management database 322 that manages information on a requested task, and an applicant information database 323 that manages information on the applicant for the contract of the requested task, in addition to the program executed by the controller 31.

FIG. 5 is a view illustrating an example of the user information database 321. Each record that configures the user information database 321 includes fields for storing a user ID that is identification information of the user, a management number that is identification information of a task requested by a client of the task, and a management number of a task which is contracted by the contractor.

FIG. 6 is a view illustrating an example of the task management database 322. Each record that configures the task management database 322 includes fields for storing a management number of the task, an image ID that is identification information of an original draft image representing an original draft of contents, a task ordering method of the task, a status of the task, and a due date of the task. Here, the task ordering method includes two methods of a designation method and a competition method. The designation method is an ordering method that designates one or more applicants among applicants whose application for a contract of a task is received and requests the task to the one or more designated applicants. Meanwhile, the competition method is an ordering method that requests all or a part of the task to two or more applicants whose application for a contract of a task is received and competitively determines which content is better. The competition method is an example of the competition method according to the present invention.

FIG. 7 is a view illustrating an example of the applicant information database 323. Each record that configures the applicant information database 323 includes fields for storing a management number of the task, a user ID of the applicant for the contract of the task, a content ID that is identification information of the content submitted by the contractor, and an order flag indicating whether to be ordered to the applicant. Here, a state where the order flag is in an on state represents that an order is issued, and a state where the order flag is in an off state represents that no order is issued. An initial value of the order flag is in the OFF state.

The controller 31 executes a program stored in the storage unit 32 to implement various functions such as a task request receiving unit 311, a contract entry receiving unit 312, a status informing unit 313, an order receiving unit 314, a user information presenting unit 315, a submission receiving unit 316, a content submitting unit 317, and a payment unit 318. The task request receiving unit 311 receives a request for a task of creating contents from the client terminal 10. Specifically, the task request receiving unit 311 receives a request for an upload screen which is issued by the client terminal 10 to transmit the upload screen to the client terminal 10. After transmitting the upload screen, when the task request transmitted from the client terminal 10 is obtained, the task request receiving unit 311 assigns a management number to a task requested from the client. After assigning the management number, the task request receiving unit 311 registers the assigned management number, the user ID of the client, the image ID of the original draft image, a status ("now collecting") of the task in the task management database 322 in association with each other. Further, the task request receiving unit 311 registers the assigned management number in the user information database 321, as a management number of the requested task, in association with the user ID of the client. After registering the management number in the user information database 321, the task request receiving unit 311 informs the assigned management number to the client terminal 10. Further, the task request receiving unit 311 posts the received task request on the contract collecting screen stored by the mediation server 30.

The contract entry receiving unit 312 receives the application for contract of the task from the contractor terminal 20. Specifically, the contract entry receiving unit 312 receives a request for the contract collecting screen issued by the contractor terminal 20 and transmits the contract collecting screen to the contractor terminal 20. After transmitting the contract collecting screen, when a contract application transmitted from the contractor terminal 20 is obtained, the contract entry receiving unit 312 registers the management number included in the contract application and the user ID of the contractor in the applicant information database 323 in association with each other.

The status informing unit 313 informs the client terminal of a status of the task requested by the client terminal 10. Specifically, the status informing unit 313 receives a request for the status screen issued by the client terminal 10 and generates the status screen of the task of the client. In this case, the status informing unit 313 specifies the status of the task based on the management number transmitted from the client terminal 10, with reference to the task management database 322. Further, when the status of the specified task is not after "completing the order," the status informing unit 313 specifies a user ID of the applicant with reference to the applicant information database 323. Then, the status informing unit 313 generates the status screen for informing the specified information and the management number of the task and transmits the status screen to the client terminal 10.

The order receiving unit 314 receives an order for creating contents issued by the client terminal 10. Specifically, the order receiving unit 314 receives a request for the order screen issued by the client terminal 10 and generates the order screen. In this case, the order receiving unit 314 specifies the user ID of the applicant based on the management number transmitted from the client terminal 10, with reference to the applicant information database 323. When the user ID of the applicant is specified, the order receiving unit 314 generates an order screen for informing the information and an option of the ordering method and transmits the order screen to the client terminal 10. After transmitting the order screen, when an order request transmitted from the client terminal 10 is obtained, the order receiving unit 314 registers the ordering method selected by the client in the task management database 322 in association with the management number transmitted from the client terminal. Further, in the task management database, the status of the task identified by the management number is updated from "collection ended" to "order completed." Further, a due date of the task is registered in the task management database. Here, for example, the due date is calculated by adding a predetermined period (for example, one week) to date and time when the order request is received from the client terminal 10. Further, the order receiving unit 314 registers the management number of the task in the user information database 321 in association with the user ID of the contractor who receives the order of the task. Further, the order receiving unit 314 sets the order flag of the contractor who receives the order of the task to be ON in the applicant information database 323.

The order receiving unit 314 is an example of a method selection receiving unit according to the present invention that receives selection of any one of the designation method and the competition method as an ordering method. Further, the order receiving unit 314 receives the selection of the ordering method after the contract entry receiving unit 312 starts reception of the application of the contract. More specifically, the contract entry receiving unit 312 starts reception of the entry of the contract, closes the reception, and presents information on the applicant to the client and then receives the selection of the ordering method. Accordingly, the client may select the ordering method in accordance with a situation of the applicant after checking the information on the applicant, so that the selection may be easily performed. Further, according to another exemplary embodiment, the order receiving unit 314 may receive the selection of the ordering method after presenting the information on the applicant to the client at that time even before closing the reception of the entry of the contract.

Further, the order receiving unit 314 is an example of a screen information output unit according to the present invention that outputs information representing a screen for receiving selection of any one of the designation method and the competition method.

The user information presenting unit 315 presents information on an order to the contractor, to the contractor terminal 20. Specifically, the user information presenting unit 315 receives a request for the user information screen issued by the contractor terminal 20 to generate a user information screen. In this case, the user information presenting unit 315 specifies a management number of a task contracted by the contractor based on a user ID transmitted from the contractor terminal 20 with reference to the user information database 321. Then, the user information presenting unit 315 specifies an ordering method of the task, a due date, and an original draft image ID which are identified by the management number, with reference to the task management database 322. Further, when the competition method is selected as the ordering method of the task, the user information presenting unit 315 specifies the number of contractors who contract the task identified by the management number with reference to the applicant information database 323. When the information is specified, the user information presenting unit 315 generates a user information screen informing the specified information and transmits the user information screen to the contractor terminal 20.

The user information presenting unit 315 is an example of a task contract requesting unit according to the present invention that when the designation method is selected, outputs information for requesting a contract of a task to one or more applicants designated among applicants whose entry is received by the contract entry receiving unit 312 and when the competition method is selected, outputs information for requesting a contract of a task to two or more applicants whose entry is received by the contract entry receiving unit 312.

The submission receiving unit 316 receives contents that are created by the contractor and transmitted from the contractor terminal 20. Specifically, when the contents transmitted from the contractor terminal 20 is obtained, the submission receiving unit 316 stores a content ID for identifying the contents in the applicant information database 323 in association with the management number and the user ID transmitted from the contractor terminal 20. After storing the content ID, when the designation method is selected as the ordering method of the task, the submission receiving unit 316 updates a status of the task identified by the management number from "order completed" to "submission completed" in the task management database 322. Meanwhile, when the competition method is selected as the ordering method of the task, the submission receiving unit 316 determines whether submission from all contractors is completed for the task identified by the management number. As a result of the determination, when the submission from all the contractors is not completed, the submission receiving unit 316 waits for the submission from another contractor. Meanwhile, when the submission from all the contractors is completed, in the task management database 322, the status of the task identified by the management number is updated from "order completed" to "submission completed."

The content submitting unit 317 submits the contents created by the contractor to the client terminal 10. Specifically, when the competition method is selected as the ordering method of the task, the content submitting unit 317 receives a request for a content list screen issued by the client terminal 10 to generate the content list screen. In this case, the content submitting unit 317 specifies a content ID of the contents submitted by each applicant based on the management number transmitted from the client terminal 10, with reference to the applicant information database 323. When each content ID is specified, the content submitting unit 317 generates the content list screen representing a reduced image of the content identified by each content ID and transmits the content list screen to the client terminal 10. When the content request transmitted from the client terminal 10 is obtained after transmitting the content list screen, the content submitting unit 317 reads out the requested content from the storage unit 32 to transmit the requested content to the client terminal 10. Meanwhile, in a case where the designation method is selected as the ordering method of the task, when the content request transmitted from the client terminal 10 is obtained, the content submitting unit 317 specifies the content ID which is associated with the management number transmitted from the client terminal and the designated contractor with reference to the applicant information database 323. Then, the content submitting unit 317 reads out the content identified by the specified content ID from the storage unit 32 to transmit the content to the client terminal 10.

When the task is completed, the payment unit 318 makes a payment for the task. Specifically, first, the payment unit 318 charges for an outsourcing cost of the task to the client of the task. For example, the payment unit 318 withdraws the outsourcing cost of the task from a designated account of the client. Second, the payment unit 318 makes a payment to the contractor of the task. For example, the payment unit 318 deposits the pay to a designated account of the contractor.

1-2. Operation 1-2-1. Task Request Operation

Figure 8:
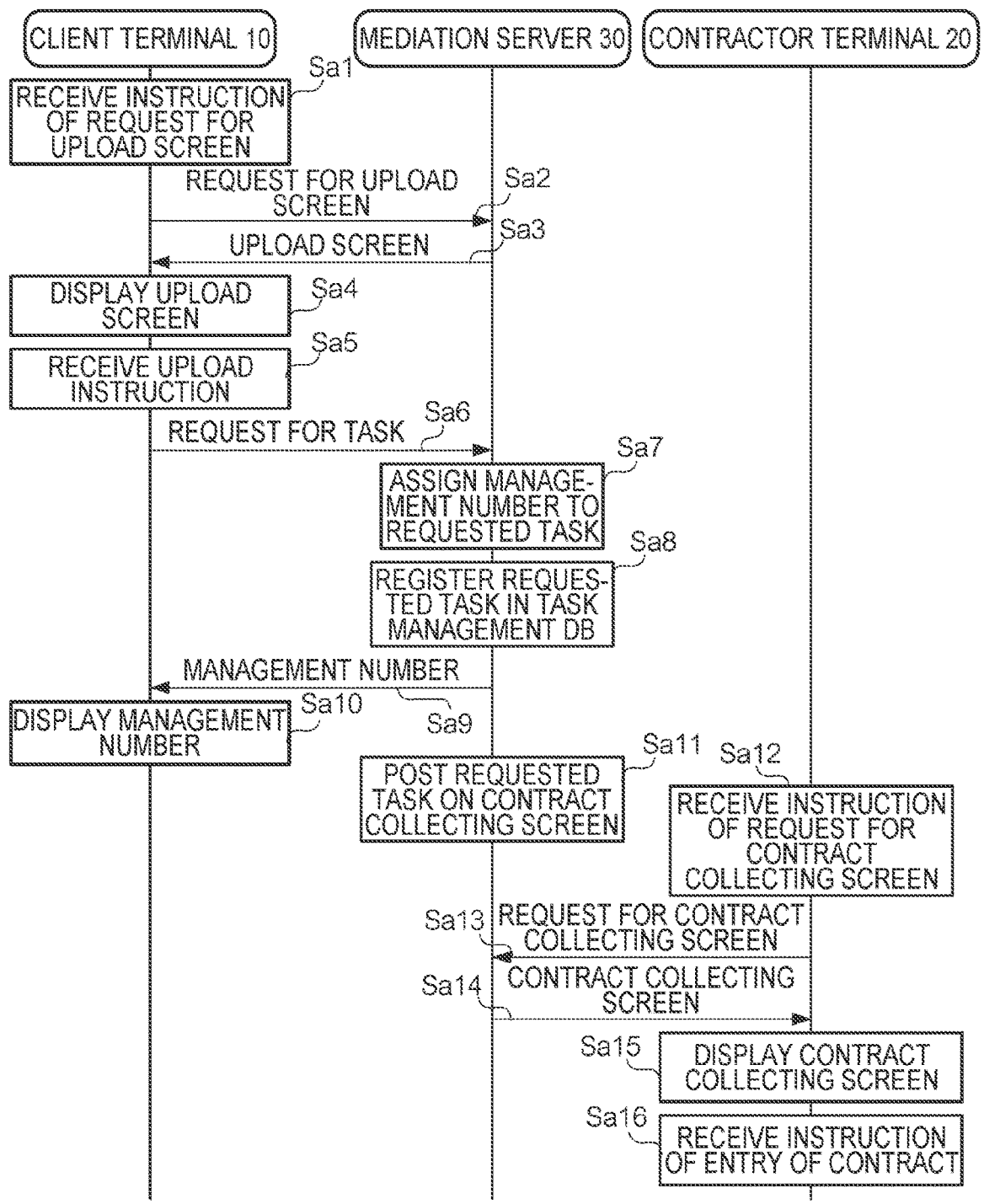
FIG. 8 is a sequence diagram illustrating an example of a task request operation.
Figure 9:
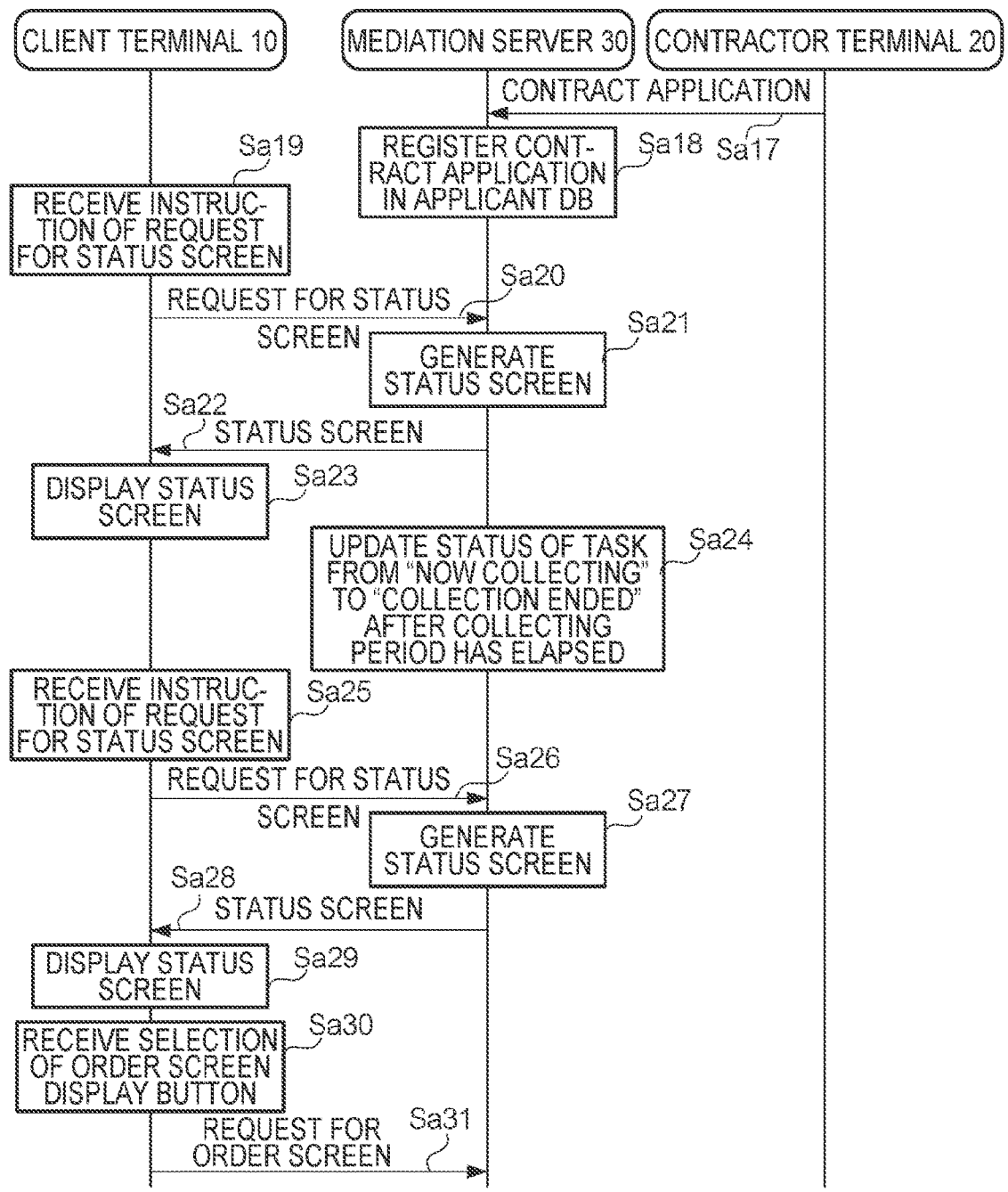
FIG. 9 is a sequence diagram illustrating an example of a task request operation.
Figure 10:
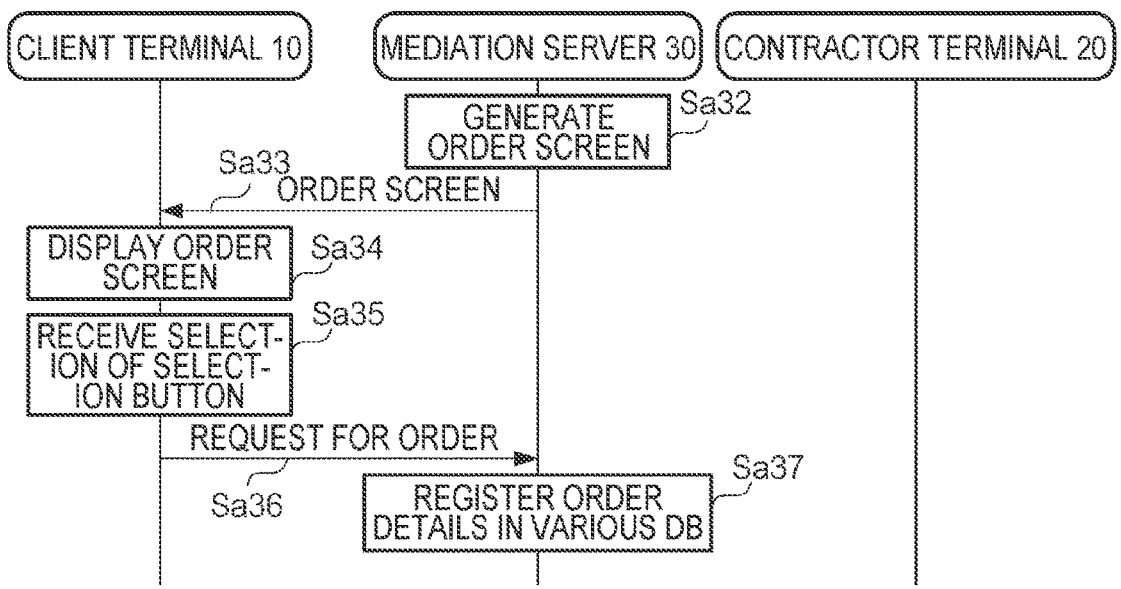
FIG. 10 is a sequence diagram illustrating an example of a task request operation.

An operation of a task outsourcing system 1 will be described. FIGS. 8 to 10 are sequence diagrams illustrating an example of a task request operation which is performed by a task outsourcing system 1. An example illustrated in the drawings is an operation of outsourcing a design of a document by a client to a contractor who is a designer. Further, in the drawings, even though only one contractor terminal 20 is illustrated for the convenience of description, plural contractor terminals 20 may be actually involved in a task request operation. The illustrated contractor terminal 20 is an example of one of the plural contractor terminals 20 which are actually involved in the task request operation.

A client who outsources a design of a document operates the operation unit 14 of the client terminal 10 to instruct a request for an upload screen to upload an image representing an original draft of the document to the mediation server 30 (step Sa1). The task requesting unit 111 of the client terminal 10 receives the instruction to request the mediation server 30 for the upload screen (step Sa2). The task request receiving unit 311 of the mediation server 30 receives a request for an upload screen which is issued by the client terminal 10 to transmit the upload screen to the client terminal 10 (step Sa3).

When the upload screen transmitted from the mediation server 30 is obtained, the task requesting unit 111 of the client terminal 10 displays the upload screen on the display 15 (step Sa4). After displaying the upload screen, when the client operates the operation unit 14 to select the image representing the original draft of the document and issue an uploading instruction (step Sa5), the task requesting unit 111 transmits a task request including the selected image to the mediation server 30 (step Sa6). The task request includes a user ID of the client. Further, in the original draft image, a comment sheet for transmitting a policy of the design or an image may be attached.

When the task request transmitted from the client terminal 10 is obtained, the task request receiving unit 311 of the mediation server 30 assigns a management number to the task requested from the client (step Sa7). After assigning the management number, the task request receiving unit 311 registers the assigned management number, the image ID of the original draft image, and a status ("now collecting") of the task in the task management database 322 in association with each other (step Sa8). Further, the task request receiving unit 311 registers the assigned management number in the user information database 321, as a management number of the requested task, in association with the user ID of the client. After registering the management number in the user information database 321, the task request receiving unit 311 informs the assigned management number to the client terminal 10 (step Sa9). The task requesting unit 111 of the client terminal 10 displays the management number informed from the mediation server 30 on the display 15 (step Sa10). In this case, the management number may be displayed together with a message for informing that the task request is safely received and a message for notifying that the management number is used as an identification number uniquely identifying the requested task. Further, the task request receiving unit 311 of the mediation server 30 posts the received task request on the contract collecting screen stored by the mediation server 30 (step Sa11). Specifically, the management number and the original draft image are posted on the contract collecting screen.

A contractor who desires a contract of a document design operates the operation unit 24 of the contractor terminal 20 to instruct the request for the contract collecting screen, in order to browse the contract collecting screen (step Sa12). The contract entry unit 211 of the contractor terminal 20 receives the instruction to request the mediation server 30 for the contract collecting screen (step Sa13). The contract entry receiving unit 312 of the mediation server 30 receives a request for the contract collecting screen issued by the contractor terminal 20 and transmits the contract collecting screen to the contractor terminal 20 (step Sa14).

When the contract collecting screen transmitted from the mediation server 30 is obtained, the contract entry unit 211 of the contractor terminal 20 displays the contract collecting screen on the display 25 (step Sa15). After watching the displayed contract collecting screen, when the contractor operates the operation unit 24 to instruct an entry of the contract for the task posted in step Sa11 (step Sa16), the contract entry unit 211 transmits a contract application including a management number of the task to the mediation server 30 (step Sa17). The contract application also includes a user ID of the contractor. Further, the contract entry unit 211 may transmit an application for notifying an intention rejecting the contract of the task to the mediation server 30.

When the contract application transmitted from the contractor terminal 20 is obtained, the contract entry receiving unit 312 of the mediation server 30 registers the management number included in the contract application and the user ID of the contractor in the applicant information database 323 in association with each other (step Sa18).

When the client who outsources the design of the document checks a collecting situation of the contract of the outsourcing task, the client operates the operation unit 14 of the client terminal 10 to instruct the request for the status screen (step Sa19). The status inquiring unit 112 of the client terminal 10 receives the instruction to request the mediation server 30 for the status screen (step Sa20). In this case, the status inquiring unit 112 transmits the management number of the task to the mediation server 30. The status informing unit 313 of the mediation server 30 receives the request for the status screen issued by the client terminal 10 and generates the status screen of the task of the client (step Sa21). When the status screen is generated, the status informing unit 313 specifies the status of the task based on the management number transmitted from the client terminal 10, by referring to the task management database 322. Further, when the specified status of the task is not after "completing the order", the status informing unit 313 specifies a user ID of the applicant with reference to the applicant information database 323. The status informing unit 313 generates the status screen for informing the specified information and the management number of the task and transmits the status screen to the client terminal 10 (step Sa22).

When the status screen transmitted from the mediation server 30 is obtained, the status inquiring unit 112 of the client terminal 10 displays the status screen on the display 15 (step Sa23). The client watches the displayed status screen and checks the status of the task and the applicant.

When a predetermined time (for example, 24 hours) elapses after obtaining the task request from the client terminal 10, the contract entry receiving unit 312 of the mediation server 30 ends the collecting of the contract of the task. As another example, when applications from all contractors are obtained, the contract entry receiving unit 312 ends the collecting of the contract of the task. When the collecting of the contract ends, the contract entry receiving unit 312 updates the status of the task in the task management database 322 from "now collecting" to "collection ended" (step Sa24). Further, the contract entry receiving unit 312 deletes the task request from the contract collecting screen stored by the mediation server 30.

Figure 11:
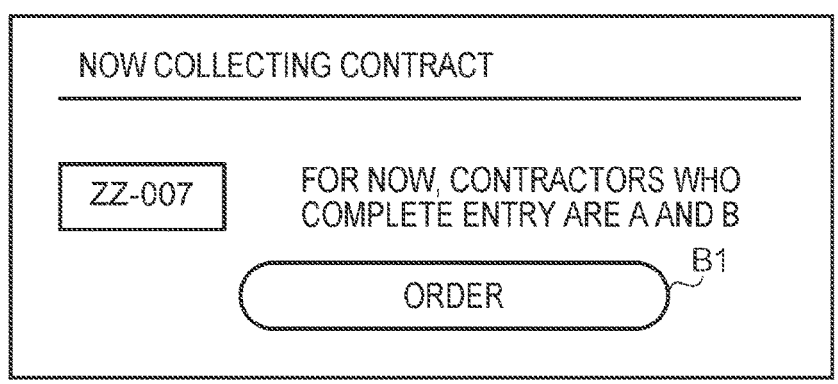
FIG. 11 is a view illustrating an example of a status screen.

After completing the collection of the contract, when the client who outsources the design of the document operates the operation unit 14 of the client terminal 10 to instruct the request for the status screen (step Sa25), the status inquiring unit 112 of the client terminal 10 requests the mediation server 30 for the status screen (step Sa26) and displays the status screen transmitted from the mediation server 30 on the display 15 (step Sa29). Here, since the description of steps Sa27 and Sa28 overlaps with the above description of steps Sa21 and Sa22, the description thereof will be omitted. FIG. 11 is a view illustrating an example of the status screen. On the screen illustrated in FIG. 11, since the collection of the contract has been already completed, an order screen display button B1 for transition to the order screen is displayed to be selectable. In the example illustrated in FIG. 11, the contract applications from two contractor terminals 20 are received.

After displaying the status screen, when the client operates the operation unit 14 of the client terminal 10 to select the order screen display button B1 (step Sa30), the ordering unit 113 of the client terminal 10 requests the mediation server 30 for the order screen (step Sa31). In this case, the ordering unit 113 transmits the management number of the task to the mediation server 30. The order receiving unit 314 of the mediation server 30 receives the request for the order screen issued by the client terminal 10 and generates the order screen (step Sa32). When the order screen is generated, the order receiving unit 314 specifies the user ID of the applicant based on the management number transmitted from the client terminal 10, with reference to the applicant information database 323. When the user ID of the applicant is specified, the order receiving unit 314 generates an order screen for informing the information and an option of the ordering method and transmits the order screen to the client terminal 10 (step Sa33).

Figure 12:
FIG. 12 is a view illustrating an example of an order screen.

When the order screen transmitted from the mediation server 30 is obtained, the ordering unit 113 of the client terminal 10 displays the order screen on the display 15 (step Sa34). FIG. 12 is a view illustrating an example of an order screen. On the order screen illustrated in FIG. 12, a selection button B2 for selecting the designation method and a selection button B3 for selecting the competition method are displayed to be selectable, as an option of the ordering method. When the designation method is selected, the cost is "9,000 yen" and when the competition method is selected, the cost is "10,000 yen." Further, a selection button for stopping the task outsourcing may also be displayed. Further, on the screen illustrated in FIG. 12, the user ID of the applicant of the contract is displayed as a designation target. Each applicant makes the selection using a radio button. However, the radio button is merely an example and may be replaced with other selection method such as a check box or a list box. In the example illustrated in FIG. 12, the contract applications from two contractor terminals 20 are received.

After displaying the order screen, when the client operates the operation unit 14 of the client terminal 10 to select one of the applicants and select the selection button B2 or the selection button B3 (step Sa35), the ordering unit 113 of the client terminal 10 transmits an order request including the selected information to the mediation server 30 (step Sa36). The order request also includes a management number of a task to be ordered. Further, two or more applicants may be selected. Further, even though the competition method is selected, an applicant who is participating in the competition may be selected. When an order request transmitted from the client terminal 10 is obtained, the order receiving unit 314 of the mediation server 30 registers the ordering method selected by the client in the task management database 322 in association with the management number transmitted from the client terminal (step Sa37). Further, in the task management database, the status of the task distinguished by the management number is updated from "collection ended" to "order completed". Further, a due date of the task is registered in the task management database. Here, for example, the due date is calculated by adding a predetermined period (for example, one week) to date and time when the order request is received from the client terminal 10. Further, the order receiving unit 314 registers the management number of the task in the user information database 321 in association with the user ID of the contractor who receives the order of the task. Further, the order receiving unit 314 sets the order flag of the contractor who receives the order of the task to be ON in the applicant information database 323.

1-2-2. Submission Operation (when Competition Method is Selected)

Figure 13:
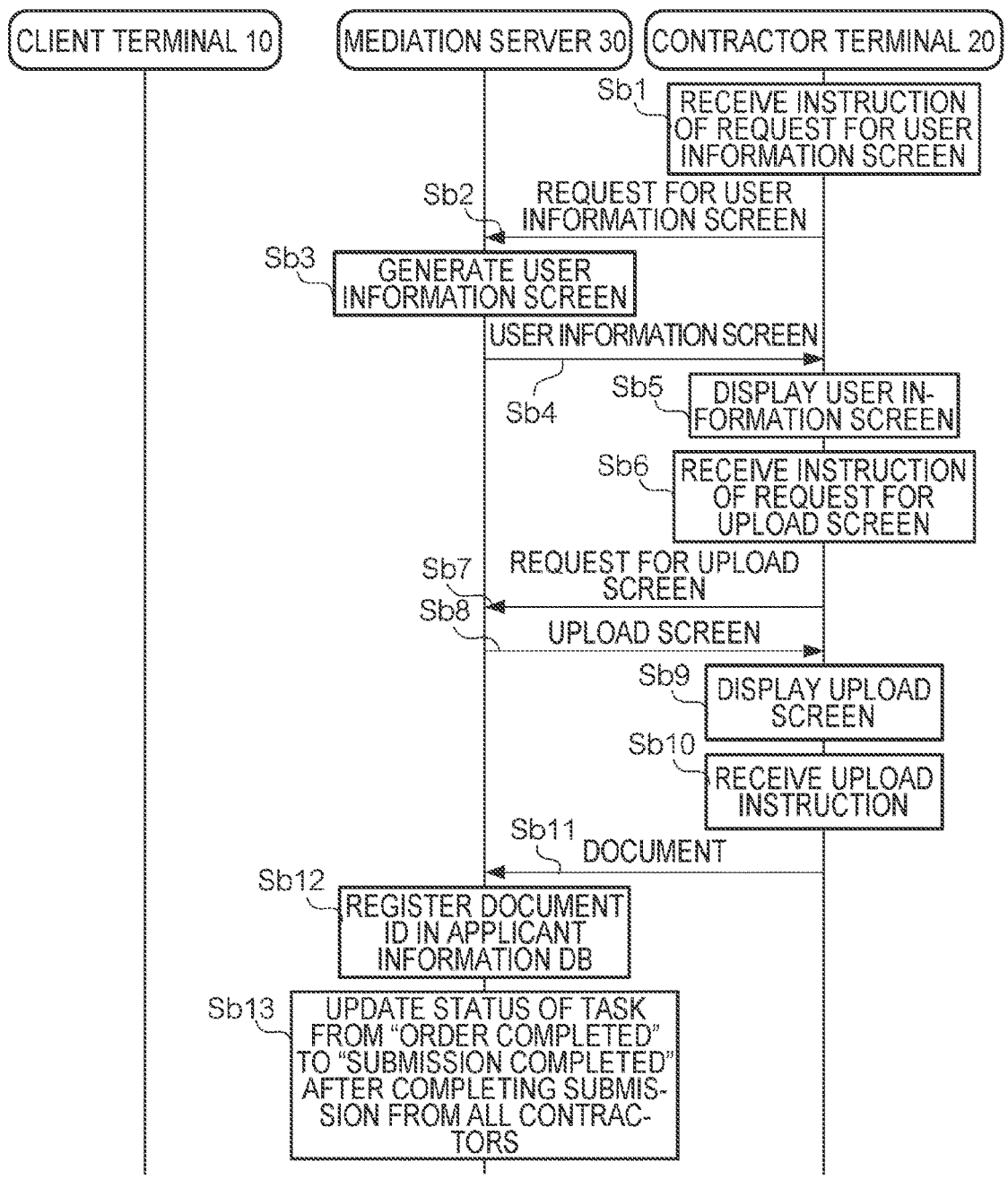
FIG. 13 is a sequence diagram illustrating an example of a submission operation.
Figure 14:
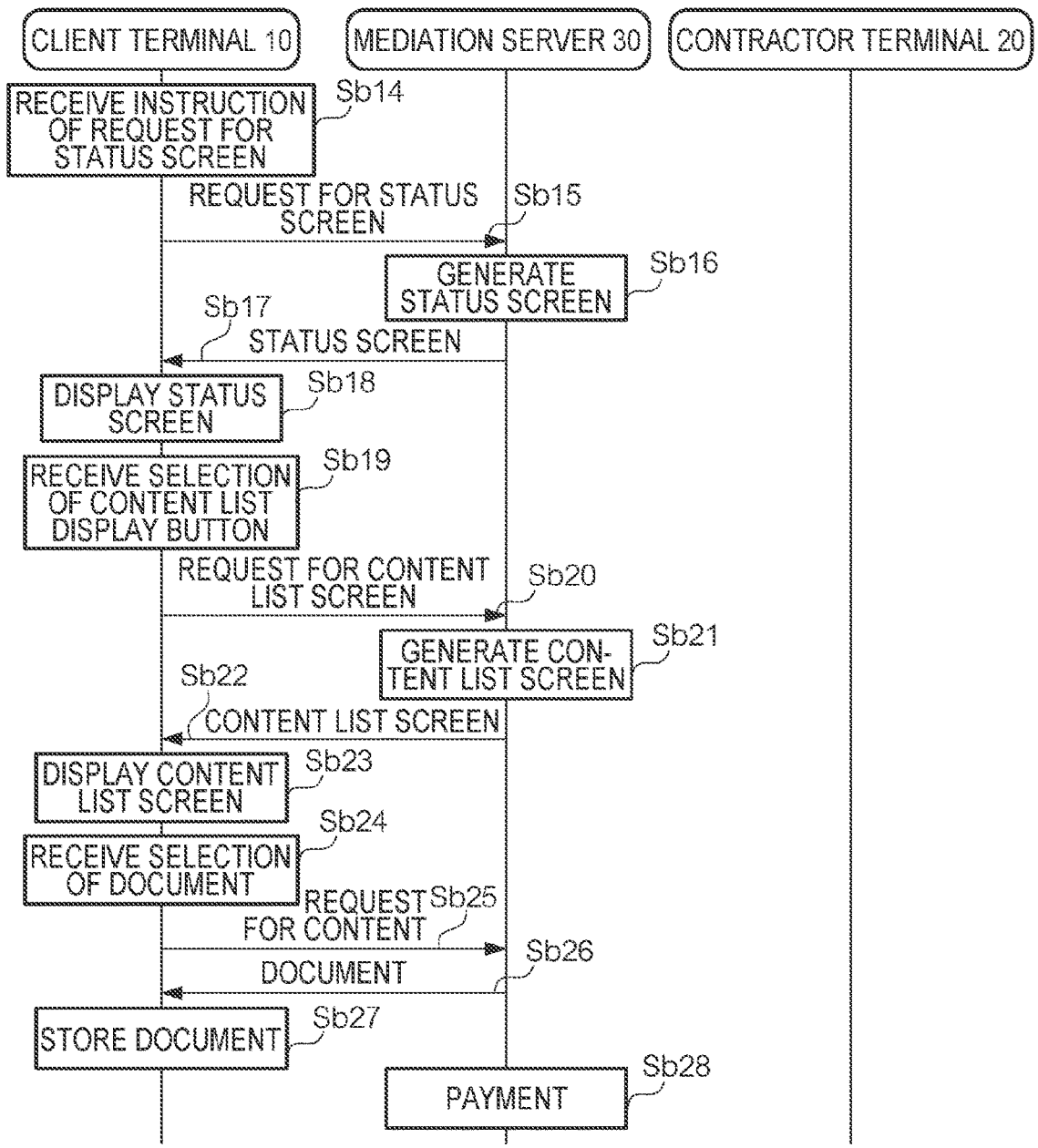
FIG. 14 is a sequence diagram illustrating an example of a submission operation.

FIGS. 13 and 14 are sequence diagrams illustrating an example of a submission operation which is performed by the task outsourcing system 1 when the competition method is selected in step Sa35. An example illustrated in FIGS. 13 and 14 is an operation in which a contractor who is a designer submits the created document to the client. Further, in FIGS. 13 and 14, even though only one contractor terminal 20 is illustrated for the convenience of description, plural contractor terminals 20 may be actually involved in a submission operation. The illustrated contractor terminal 20 is an example of one of the plural contractor terminals 20 which are actually involved in the submission operation.

After ordering by the client, the contractor who checks whether there is an order to the contractor operates the operation unit 24 of the contractor terminal 20 to instruct a request for the user information screen (step Sb1). The user information inquiring unit 212 of the contractor terminal 20 receives the instruction to request the mediation server 30 for the user information screen (step Sb2). In this case, the user information inquiring unit 212 transmits the user ID of the contractor to the mediation server 30. The user information presenting unit 315 of the mediation server 30 receives the request for the user information screen issued by the contractor terminal 20 to generate the user information screen (step Sb3). In generating the user information screen, the user information presenting unit 315 specifies a management number of a task contracted by the contractor based on the user ID transmitted from the contractor terminal 20 with reference to the user information database 321. Then, the user information presenting unit 315 specifies an ordering method of the task, a due date, and an original draft image ID which are identified by the management number, with reference to the task management database 322. Further, when the competition method is selected as the ordering method of the task, the user information presenting unit 315 specifies the number of contractors who contract the task distinguished by the management number with reference to the applicant information database 323. When the information is specified, the user information presenting unit 315 generates the user information screen through which the management number of the task, the ordering method, the due date, the original image, and the number of contractors are informed, and transmits the user information screen to the contractor terminal 20 (step Sb4).

When the user information screen transmitted from the mediation server 30 is obtained, the user information inquiring unit 212 of the contractor terminal 20 displays the user information screen on the display 25 (step Sb5). The contractor checks the ordering method of the task, the due date, the original image, and the number of contractors by watching the displayed user information screen.

When the contractor completes the design of the document with reference to the original image displayed on the user information screen, the contractor operates the operation unit 24 of the contractor terminal 20 to instruct the request for the upload screen (step Sb6) in order to upload the document to the mediation server 30 (Sb6). The submitting unit 213 of the contractor terminal 20 receives the instruction to request the mediation server 30 for the upload screen (step Sb7). The submission receiving unit 316 of the mediation server 30 receives the request for the upload screen issued by the contractor terminal 20 to transmit the upload screen to the contractor terminal 20 (step Sb8).

When the upload screen transmitted from the mediation server 30 is obtained, the submitting unit 213 of the contractor terminal 20 displays the upload screen on the display 25 (step Sb9). After displaying the upload screen, when the contractor operates the operation unit 24 to select the created document and instruct to upload the selected document (step Sb10), the submitting unit 213 transmits the selected document to the mediation server 30 (step Sb11). In this case, the submitting unit 213 transmits the management number of the contracted task and the user ID of the contractor to the mediation server 30.

When the document transmitted from the contractor terminal 20 is obtained, the submission receiving unit 316 of the mediation server 30 stores a content ID identifying the document in the applicant information database 323 in association with the management number and the user ID transmitted from the contractor terminal 20 (step Sb12). After storing the content ID, the submission receiving unit 316 determines whether the submission of the task identified by the management number is completed from all the contractors. As a result of the determination, when it is determined that the submission from all contractors is not completed, the submission receiving unit 316 waits for the submission from another contractor. Meanwhile, when it is determined that the submission from all contractors is completed, the submission receiving unit 316 updates the status of the task distinguished by the management number from "order completed" to "submission completed" in the task management database 322 (step Sb13).

Figure 15:
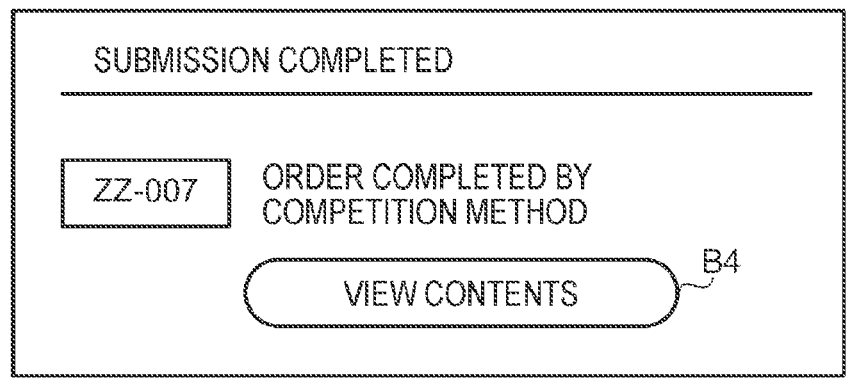
FIG. 15 is a view illustrating an example of a status screen.

After completing the submission from all the contractors, when the client operates the operation unit 14 of the client terminal 10 to instruct the request for the status screen (step Sb14), the status inquiring unit 112 of the client terminal 10 requests the mediation server 30 for the status screen (step Sb15) and displays the status screen transmitted from the mediation server 30 on the display 15 (step Sb18). Here, since the description of steps Sb16 and Sb17 overlaps with the above description of steps Sa21 and Sa22, the description thereof will be omitted. FIG. 15 is a view illustrating an example of a status screen. Since the submission from all the contractors has been already completed, on the screen illustrated in FIG. 15, a content list displaying button B4 for transition to a content list screen is displayed to be selectable.

After displaying the status screen, when the client operates the operation unit 14 of the client terminal 10 to select the content list display button B4 (step Sb19), the content obtaining unit 114 of the client terminal 10 requests the mediation server 30 for the content list screen (step Sb20). In this case, the content obtaining unit 114 transmits the management number of the task to the mediation server 30. The content submitting unit 317 of the mediation server 30 receives the request for the content list screen issued by the client terminal 10 and generates the content list screen (step Sb21). In generating the content list screen, the content submitting unit 317 specifies a content ID of the document submitted by each applicant based on the management number transmitted from the client terminal 10, with reference to the applicant information database 323. When each content ID is specified, the content submitting unit 317 generates the content list screen representing a reduced image of the document identified by each content ID and transmits the content list screen to the client terminal 10 (step Sb22).

Figure 16:
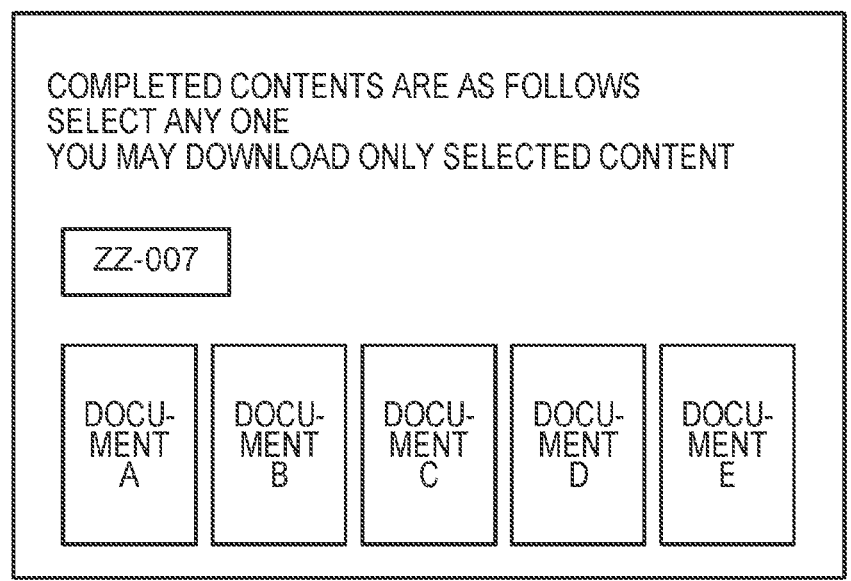
FIG. 16 is a view illustrating an example of a content list screen.

When the content list screen transmitted from the mediation server 30 is obtained, the content obtaining unit 114 of the client terminal 10 displays the content list screen on the display 15 (step Sb23). FIG. 16 is a view illustrating an example of a content list screen. On the content list screen illustrated in FIG. 16, the reduced image of the document which is submitted by each contractor is displayed to be selectable. Only one of the documents displayed on the content list screen may be downloaded. The reduced image of the document may be selected by the client and displayed to be enlarged. However, a resolution of an image which is displayed to be enlarged may be lower than that of an original document. In the example illustrated in FIG. 16, the documents are submitted from five (5) contractor terminals 20.

After displaying the content list screen, when the client operates the operation unit 14 of the client terminal 10 to select any one document (step Sb24), the content obtaining unit 114 of the client terminal 10 transmits the content request including the content ID of the selected document to the mediation server 30 (step Sb25). When the content request transmitted from the client terminal 10 is obtained, the content submitting unit 317 of the mediation server 30 reads the requested document from the storage unit 32 to transmit the document to the client terminal 10 (step Sb26). In this case, the content submitting unit 317 may transmit a message informing the completion of the task outsourcing service together with the document. The content obtaining unit 114 of the client terminal 10 stores the document transmitted from the mediation server 30 in the storage unit 12 (step Sb27). Further, when the downloaded document needs to be edited, the client may instruct the contractor to edit the document, through the mediation server 30.

When the submission to the client is completed, the payment unit 318 of the mediation server 30 makes a payment for the completed task (step Sb28). Specifically, first, the payment unit 318 charges an outsourcing cost (10,000 yen for the competition method) of the task to the client. For example, the payment unit 318 withdraws the outsourcing cost of the task from a designated account of the client. Second, the payment unit 318 makes a payment to the contractor. More specifically, the payment unit 318 pays 4,000 yen as a reward to the contractor whose document is adopted and pays an amount obtained by dividing 2,000 yen by (the number of contractors −1) as a reward to a contractor whose document is not adopted. For example, the payment unit 318 deposits the reward to a designated account of each contractor.

1-2-3. Submission Operation (when Designation Method is Selected)

Figure 17:
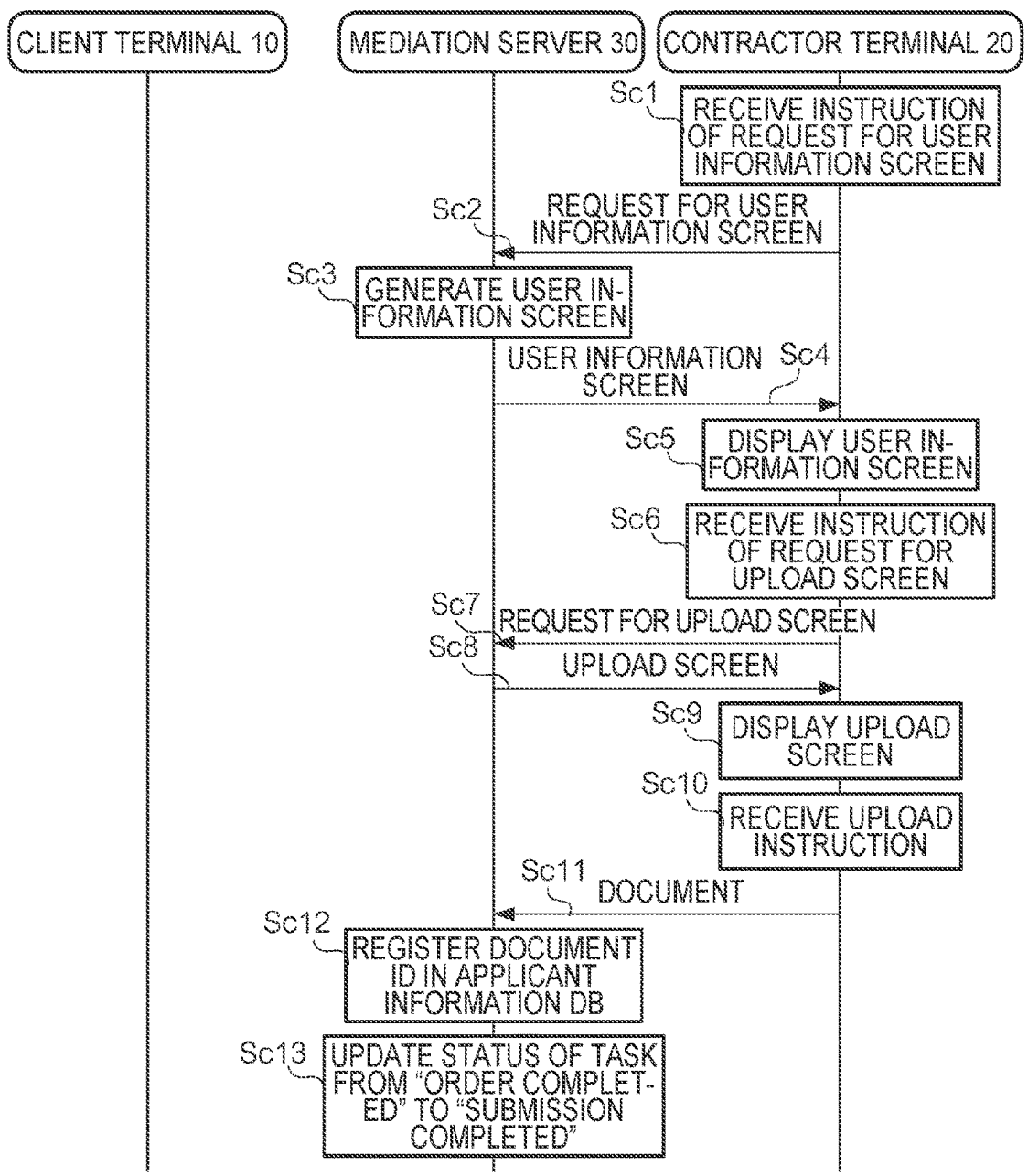
FIG. 17 is a sequence diagram illustrating an example of a submission operation.
Figure 18:
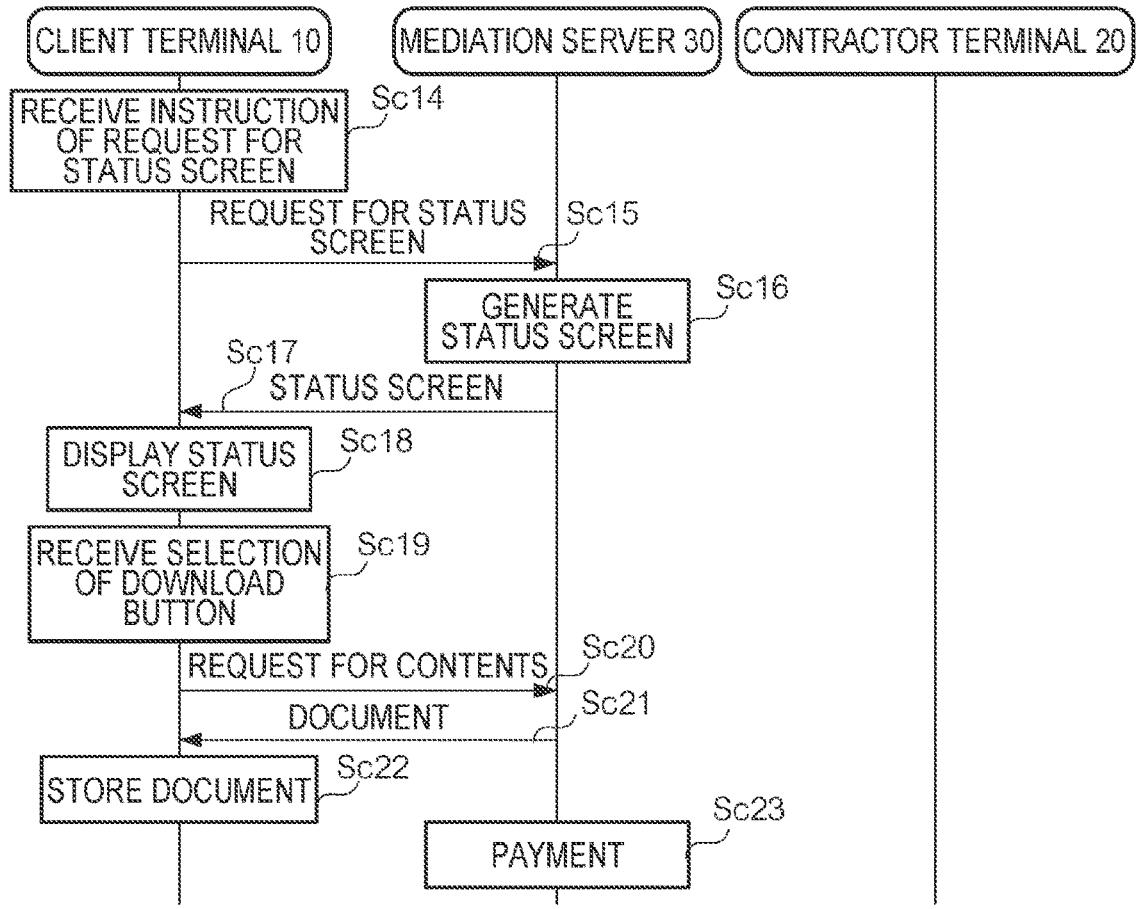
FIG. 18 is a sequence diagram illustrating an example of a submission operation.

FIGS. 17 and 18 are sequence diagrams illustrating an example of a submission operation which is performed by the task outsourcing system 1 when the designation method is selected in step Sa35. An example illustrated in FIGS. 17 and 18 is an operation in which a contractor who is a designer submits the created document to the client. Further, in FIGS. 17 and 18, even though only one contractor terminal 20 is illustrated for the convenience of description, plural contractor terminals 20 may be actually involved in a submission operation. The illustrated contractor terminal 20 is an example of one of the plural contractor terminals 20 which are actually involved in the submission operation.

After placing an order by the client, the contractor who checks whether there is an order to the contractor operates the operation unit 24 of the contractor terminal 20 to instruct a request for the user information screen (step Sc1). The user information inquiring unit 212 of the contractor terminal 20 receives the instruction to request the mediation server 30 for the user information screen (step Sc2). In this case, the user information inquiring unit 212 transmits the user ID of the contractor to the mediation server 30. The user information presenting unit 315 of the mediation server 30 receives the request for the user information screen issued by the contractor terminal 20 to generate the user information screen (step Sc3). In generating the user information screen, the user information presenting unit 315 specifies a management number of a task contracted by the contractor based on the user ID transmitted from the contractor terminal 20 with reference to the user information database 321. Then, the user information presenting unit 315 specifies an ordering method of the task, a due date, and an original draft image ID, which are identified by the management number, with reference to the task management database 322. When the information is specified, the user information presenting unit 315 generates the user information screen through which the management number of the task, the ordering method, the due date, and the original image are informed, and transmits the user information screen to the contractor terminal 20 (step Sc4).

When the user information screen transmitted from the mediation server 30 is obtained, the user information inquiring unit 212 of the contractor terminal 20 displays the user information screen on the display 25 (step Sc5). The contractor checks the ordering method of the task, the due date, and the original image by watching the displayed user information screen.

When the contractor completes the design of the document with reference to the original image displayed on the user information screen, the contractor operates the operation unit 24 of the contractor terminal 20 to instruct the request for the upload screen (step Sc6) in order to upload the document to the mediation server 30. The submitting unit 213 of the contractor terminal 20 receives the instruction to request the mediation server 30 for the upload screen (step Sc7). The submission receiving unit 316 of the mediation server 30 receives the request for the upload screen issued by the contractor terminal 20 to transmit the upload screen to the contractor terminal 20 (step Sc8).

When the upload screen transmitted from the mediation server 30 is obtained, the submitting unit 213 of the contractor terminal 20 displays the upload screen on the display 25 (step Sc9). After displaying the upload screen, when the contractor operates the operation unit 24 to select the created document and instruct to upload the selected document (step Sc10), the submitting unit 213 transmits the selected document to the mediation server 30 (step Sc11). In this case, the submitting unit 213 transmits the management number of the contracted task and the user ID of the contractor to the mediation server 30.

When the document transmitted from the contractor terminal 20 is obtained, the submission receiving unit 316 of the mediation server 30 stores a content ID identifying the document in the applicant information database 323 in association with the management number and the user ID transmitted from the contractor terminal 20 (step Sc12). After storing the content ID, the submission receiving unit 316 updates the status of the task distinguished by the management number from "order completed" to "submission completed" in the task management database 322 (step Sc13).

Figure 19:
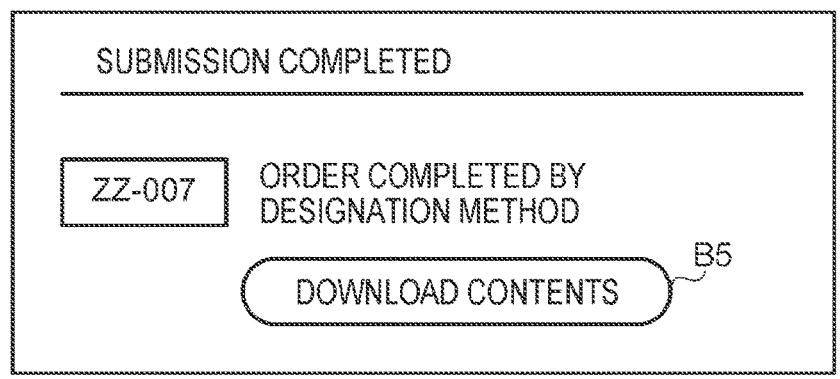
FIG. 19 is a view illustrating an example of a status screen.

After completing the submission from the designated contractor, when the client operates the operation unit 14 of the client terminal 10 to instruct the request for the status screen (step Sc14), the status inquiring unit 112 of the client terminal 10 requests the mediation server 30 for the status screen (step Sc15) and displays the status screen transmitted from the mediation server 30 on the display 15 (step Sc18). Here, since the description of steps Sc16 and Sc17 overlaps with the above description of steps Sa21 and Sa22, the description thereof will be omitted. FIG. 19 is a view illustrating an example of a status screen. Since the submission from the designated contractor has been already completed, a download button B5 for downloading the submitted document is displayed to be selectable, on the screen illustrated in FIG. 19.

After displaying the status screen, when the client operates the operation unit 14 of the client terminal 10 to select the download button B5 (step Sc19), the content obtaining unit 114 of the client terminal 10 transmits a content request for requesting the submitted document to the mediation server 30 (step Sc20). The content request includes the management number of the task. When the content request transmitted from the client terminal 10 is obtained, the content submitting unit 317 of the mediation server 30 specifies the content ID which is associated with the management number transmitted from the client terminal and the designated contractor with reference to the applicant information database 323. Then, the content submitting unit 317 reads out the document identified by the specified content ID from the storage unit 32 to transmit the content to the client terminal 10 (step Sc21). In this case, the content submitting unit 317 may transmit a message informing the completion of the task outsourcing service together with the document. The content obtaining unit 114 of the client terminal 10 stores the document transmitted from the mediation server 30 in the storage unit 12 (step Sc22). Further, when the downloaded document needs to be edited, the client may instruct the contractor to edit the document, through the mediation server 30.

When the submission to the client is completed, the payment unit 318 of the mediation server 30 makes a payment for the completed task (step Sc23). Specifically, first, the payment unit 318 charges a task outsourcing cost (9,000 yen for the designation method) to the client. For example, the payment unit 318 withdraws the outsourcing cost of the task from a designated account of the client. Second, the payment unit 318 pays 4,000 yen to the designated contractor as a reward. For example, the payment unit 318 deposits the reward to a designated account of the designated contractor.

In the above-described task outsourcing system 1 according to the exemplary embodiment, two options of the designation method and the competition method are provided to the client of the task. Further, a chance to select the ordering method is given after providing information on the applicant of the contract of the task. Further, in the task outsourcing system, the mediation server 30 mediates the exchange of information between the client and the contractor, and the information is not directly exchanged between the client and the contractor, so that the mediator may not be excluded. Simultaneously, a situation in which the contractor receives complaints about the contents directly from the client may be avoided.

2. Modified Example

The above-described exemplary embodiment may be modified as follows. Further, the following modified examples may be combined with one or more other modified examples.

2-1. Modified Example 1

The design of the document exemplified in the above-described exemplary embodiment is merely an example of a task. The task outsourced by the task outsourcing system may be outsourced. When a solution is not uniquely determined, the task is not limited to the design of the document. For example, in addition to the design, document creation, layout, writing, composition, image production, programming, and the like are included. Objects of the design include architecture, fashion, arts, and the like in addition to the document. Objects of document creation include translation, article, copy, and the like (a sentence of advertisement). Objects of layout include architecture, circuit, machine, and the like. Objects of image production include commercial and the like.

The document exemplified in the above-described exemplary embodiment is merely an example of contents. The task outsourced by the task outsourcing system 1 may be a task for creating a photograph, a sound, an image, a program, and the like in addition to the document.

2-2. Modified Example 2

The mediation server 30 related with the above-described exemplary embodiment is a web server and exchanges information between the client terminal 10 and the contractor terminal 20 through a web page. However, a section that exchanges information is not limited to the web page. For example, the mediation server 30 may exchange information between the client terminal 10 and the contractor terminal 20 by electronic mail. In this case, the task request receiving unit 311 of the mediation server 30 receives the request for a task from the client terminal 10 by electronic mail. The contract entry receiving unit 312 receives the entry for contract of the task from the contractor terminal 20 by electronic mail. The order receiving unit 314 receives selection of any one of the designation method and the competition method from the client terminal 10 by electronic mail. The user information presenting unit 315 outputs information for requesting the contract of the task to the contractor terminal 20 by the electronic mail.

2-3. Modified Example 3

When the competition method is selected as the ordering method of the task, the user information presenting unit 315 of the mediation server 30 related with the above-described exemplary embodiment outputs information for requesting the contract for all of the task to the contractor terminal 20. However, rather than all of the task, information for requesting the contract for a part of the task may be output. Further, information for requesting the contract of all of the task may be output only to a contractor terminal 20 of a contractor selected by the client among contractors who create the contents. That is, information for requesting a contract of a trial task may be output. Here, the part of the task refers to, for example, a design of the first paragraph of the document, a design of the first page of the document formed by plural pages, or the like.

2-4. Modified Example 4

The order receiving unit 314 of the mediation server 30 related with the above-described exemplary embodiment may output information indicating a screen for recommending a selection of any one of the designation method and the competition method to the client terminal 10 according to an applicant whose entry is received by the contract entry receiving unit 312, in order to support the client to select the ordering method. For example, the order receiving unit 314 may output the order screen for recommending a selection of any one of the designation method and the competition method according to the number of applicants. Specifically, when the number of applicants is smaller than a predetermined number, the order receiving unit 314 may output an order screen for recommending the designation method. Alternatively, when the number of applicants is equal to or larger than a predetermined number, the order receiving unit 314 may output an order screen for recommending the competition method (or the designation method). Here, the predetermined number may be set by the client.

As still another example, the order receiving unit 314 may output the order screen for recommending a selection of any one of the designation method and the competition method according to the characteristic of the applicant. In other words, when the characteristic of the applicant satisfies a predetermined condition, the order receiving unit 314 may output the order screen for recommending selection of any one of the designation method and the competition method. Here, for example, the characteristic of the applicant may be, for example, a contract performance of the task (the number of contracts), a property (for example, age, sex, and qualification), a contract cost (an amount requested by the applicant), evaluation, and the like. The contract performance and evaluation of the task includes contract performance and evaluation of a task requested by the client and contract performance and evaluation of a task requested by entire clients including other clients. Further, the evaluation is, for example, an evaluation on a quality of contents and a submission speed. A value of evaluation may be represented, for example, by an average value or the lowest value in the past. The characteristic of the applicant is registered in the user information database 321, for example, in association with the user ID of the applicant. The evaluation of the applicant (that is, the contractor) may be sequentially updated, for example, by receiving feedback from the clients after making a payment for the task. Further, the predetermined condition may be set by the client.

Specifically, when there is an applicant who has a predetermined number or more of cases of contracting the tasks requested by the client in the past, the order receiving unit 314 may output an order screen for recommending the designation method. In contrast, when there is no applicant described above, the order receiving unit 314 may output an order screen for recommending the competition method. Alternatively, when there is an applicant having a predetermined value or larger of evaluations of the client, the order receiving unit 314 may output an order screen for recommending the designation method. In contrast, when there is no applicant described above, the order receiving unit 314 may output an order screen for recommending the competition method. Alternatively, when there is an applicant having a predetermined qualification, the order receiving unit 314 may output an order screen for recommending the designation method. In contrast, when there is no applicant described above, the order receiving unit 314 may output an order screen for recommending the competition method.

As still another example, the order receiving unit 314 may output the order screen for recommending selection of any one of the designation method and the competition method according to the number of applicants and the characteristics of the applicants. In other words, when there are a predetermined number or more of applicants whose characteristic satisfies a predetermined condition, the order receiving unit 314 may output the order screen for recommending selection of any one of the designation method and the competition method. Here, the predetermined number and condition may be set by the client. Specifically, when there are a predetermined number or more of applicants who have a predetermined number or more of cases of contracting the tasks requested by the client in the past, the order receiving unit 314 may output an order screen for recommending the designation method. In contrast, when the condition is not satisfied, the order receiving unit 314 may output an order screen for recommending the competition method. Alternatively, when there are a predetermined number or more of applicants having a predetermined value or larger of evaluations of the client, the order receiving unit 314 may output an order screen for recommending the designation method. In contrast, when the condition is not satisfied, the order receiving unit 314 may output an order screen for recommending the competition method. Alternatively, when there are a predetermined number or more of applicants having a predetermined qualification, the order receiving unit 314 may output an order screen for recommending the designation method. In contrast, when the condition is not satisfied, the order receiving unit 314 may output an order screen for recommending the competition method.

Further, the screen for recommending selection of any one of the designation method and the competition method refers to, for example, a screen for receiving selection of only one ordering method. Alternatively, the screen is a screen for emphasizing display of any one of the ordering methods.

Further, the order receiving unit 314 according to this modified example is an example of a screen information output unit according to the present invention that outputs information representing a screen for recommending selection of any one of the designation method and the competition method.

2-5. Modified Example 5

The order receiving unit 314 related to the above-described modified example 4 outputs information indicating a screen for recommending selection of any one of the designation method and the competition method according to the applicant whose entry is received by the contract entry receiving unit 312, but may select any one of the designation method and the competition method, instead of outputting the information. That is, the order receiving unit 314 may not select the method by the client but select the ordering method according to the applicant, in order to support the client to select the ordering method. Further, when the number of applicants who satisfy the predetermined condition is smaller than a predetermined number (for example, there is only one applicant), the order receiving unit 314 may select the applicant. The order receiving unit 314 related with the present modified example is an example of a method selecting unit related with the present invention.

2-6. Modified Example 6

On the order screen (see FIG. 12) related with the above-described exemplary embodiment, information on the applicant may be arranged according to the characteristics of the applicant. For example, the information on the applicant may be arranged in an ascending order or a descending order of values representing the characteristics of the applicant. Here, the characteristics of the applicant are described above.

2-7. Modified Example 7

A program executed by the controller 31 of the mediation server 30 related with the above-described exemplary embodiment may be provided to be stored in a storage medium such as a magnetic disk, an optical disc, a magnetooptical disc, or a memory. Further, the program may be downloaded through a communication line such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a task request receiving unit that receives a request for a task of creating contents;
a contract entry receiving unit that receives an entry of a contract of the task;
a method selection receiving unit that receives a selection of any one of:
a designation method that designates one or more applicants among applicants whose entry is received by the contract entry receiving unit and requests the task to the one or more designated applicants;
a competition method that requests all or a part of the task to two or more applicants whose entry is received by the contract entry receiving unit and competitively determines which content is better;
a task contract requesting unit that outputs information for requesting a contract of the task to the one or more applicants designated among the applicants whose entry is received by the contract entry receiving unit if the designation method is selected and outputs information for requesting a contract of all or a part of the task to the two or more applicants whose entry is received by the contract entry receiving unit if the competition method is selected; and
a content obtaining unit that obtains a content list screen including reduced images of original documents corresponding to a plurality of entries received by the contract entry receiving unit,
wherein, in response to the competition method being selected, the content obtaining unit obtains and displays the content list screen, and
wherein the information processing apparatus is configured to, in response to an entry from among the plurality of entries being selected, enlarge and display the reduced image of the original document corresponding to the selected entry at a lower resolution than a resolution of one of the original documents corresponding to the selected entry.

2. The information processing apparatus according to claim 1, further comprising:
a screen information output unit that outputs information representing a screen which recommends selection of any one of the designation method and the competition method according to an applicant whose entry is received by the contract entry receiving unit.

3. The information processing apparatus according to claim 1, further comprising:
a method selecting unit that selects any one of the designation method and the competition method according to the applicant whose entry is received by the contract entry receiving unit.

4. The information processing apparatus according to claim 1, wherein
after outputting information representing a screen on which information on an applicant whose entry is received by the contract entry receiving unit is displayed, the method selection receiving unit receives the selection.

5. The information processing apparatus according to claim 1, further comprising:
a screen information output unit that outputs information representing a screen which receives selection of any one of the designation method and the competition method, wherein
information on applicants whose entry is received by the contract entry receiving unit is arranged on the screen according to characteristics of the applicants.

6. An information processing method, comprising:
receiving a request for a task of creating contents;
receiving an entry of a contract of the task;
receiving a selection of any one of a designation method that designates one or more applicants among applicants whose entry is received by the contract entry receiving unit and requests the task to the one or more designated applicants, and a competition method that requests all or a part of the task to two or more applicants whose entry is received by the contract entry receiving unit and competitively determines which content is better; and
outputting information for requesting a contract of the task to the one or more applicants designated among the applicants whose entry is received by the contract entry receiving unit if the designation method is selected and outputting information for requesting a contract of all or a part of the task to the two or more applicants whose entry is received by the contract entry receiving unit if the competition method is selected;
obtaining a content list screen including reduced images of original documents corresponding to a plurality of received entries;
in response to the competition method being selected, obtaining and displaying the content list screen; and
in response to an entry from among the plurality of entries being selected, enlarging and displaying the reduced image of the original document corresponding to the selected entry at a lower resolution than a resolution of one of the original documents corresponding to the selected entry.

7. A non-transitory computer readable medium storing a program causing a computer to function as:
a task request receiving unit that receives a request for a task of creating contents;
a contract entry receiving unit that receives an entry of a contract of the task;
a method selection receiving unit that receives a selection of any one of a designation method that designates one or more applicants among applicants whose entry is received by the contract entry receiving unit and requests the task to the one or more designated applicants, and a competition method that requests all or a part of the task to two or more applicants whose entry is received by the contract entry receiving unit and competitively determines which content is better;
a task contract requesting unit that outputs information for requesting a contract of the task to the one or more applicants designated among the applicants whose entry is received by the contract entry receiving unit if the designation method is selected and outputs information for requesting a contract of all or a part of the task to the two or more applicants whose entry is received by the contract entry receiving unit if the competition method is selected; and
a content obtaining unit that obtains a content list screen including reduced images of original documents corresponding to a plurality of entries received by the contract entry receiving unit,
wherein, in response to the competition method being selected, the content obtaining unit obtains and displays the content list screen, and
wherein, in response to an entry from among the plurality of entries being selected, the reduced image of the original document corresponding to the selected entry is enlarged and displayed at a lower resolution than a resolution of one of the original documents corresponding to the selected entry.

8. The information processing apparatus according to claim 1, wherein the method selection receiving unit receives the selection after the contract entry receiving unit has received the entry of the contract of the task.

9. The information processing method according to claim 6, wherein the selection is received after the receiving the entry of the contract of the task.

10. The non-transitory computer readable medium according to claim 7, wherein the selection is received after the contract entry receiving unit has received the entry of the contract of the task.

11. The information processing apparatus according to claim 1, wherein the characteristics of the applicants include at least one from among a number of contracts performed by an applicant, an age of the applicant, a gender of the applicant, a qualification of the applicant, a cost of the contract corresponding to the entry, a quality of content previously submitted by the applicant, and a submission speed of the applicant.

* * * * *